(12) United States Patent
Jin et al.

(10) Patent No.: US 10,135,926 B2
(45) Date of Patent: Nov. 20, 2018

(54) SHUFFLE EMBEDDED DISTRIBUTED STORAGE SYSTEM SUPPORTING VIRTUAL MERGE AND METHOD THEREOF

(71) Applicant: Electronics and Telecommunications Research Institute, Daejeon (KR)

(72) Inventors: Ki Sung Jin, Daejeon (KR); Young Chang Kim, Daejeon (KR); Young Kyun Kim, Daejeon (KR); Hong Yeon Kim, Daejeon (KR); Wan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 414 days.

(21) Appl. No.: 14/919,135

(22) Filed: Oct. 21, 2015

(65) Prior Publication Data

US 2016/0366225 A1 Dec. 15, 2016

(30) Foreign Application Priority Data

Jun. 9, 2015 (KR) ........................ 10-2015-0081437

(51) Int. Cl.
*G06F 17/30* (2006.01)
*H04L 29/08* (2006.01)

(52) U.S. Cl.
CPC ........ *H04L 67/1097* (2013.01); *G06F 17/303* (2013.01); *G06F 17/30138* (2013.01); *G06F 17/30312* (2013.01)

(58) Field of Classification Search
None
See application file for complete search history.

(56) References Cited

U.S. PATENT DOCUMENTS 7,349,406 B1* 3/2008 Robins .................... H04L 47/10
370/235
8,266,192 B2* 9/2012 Nemoto ............ G06F 17/30221
707/821

(Continued)

FOREIGN PATENT DOCUMENTS

KR 2012-0092930 A 8/2012
KR 2014-0055093 A 5/2014

OTHER PUBLICATIONS

Maltzahn, C. et al., "Ceph as a scalable alternative to the Hadoop Distributed File System," LOGIN, vol. 35(4), pp. 38-49 (Aug. 2010).

*Primary Examiner* — Hung Le
(74) *Attorney, Agent, or Firm* — Rabin & Berdo, P.C.

(57) ABSTRACT

Provided herein is a shuffle embedded distributed storage system and method supporting virtual merge, the system and method including a distributed shared storage configured to store a virtual merged file; a plurality of map servers connected to the distributed shared storage via a network, and configured to perform a map function and record a map result data computed as a result of the map function in the distributed shared storage by means of a map result file; and a plurality of reduce servers connected to the distributed shared storage and the map servers via the network, wherein the virtual merged file includes a list of the map result files recorded by the plurality of map servers, and an identifier of a reduce server to which the virtual merged file is to be transmitted.

6 Claims, 8 Drawing Sheets

(56) References Cited

U.S. PATENT DOCUMENTS

| | | | |
|---|---|---|---|
| 8,990,526 B2* | 3/2015 | Wade | G06F 3/061 |
| | | | 707/616 |
| 9,022,869 B1* | 5/2015 | DeSanti | G07F 17/3225 |
| | | | 463/42 |
| 9,164,678 B2* | 10/2015 | Wade | G06F 3/061 |
| 9,389,994 B2* | 7/2016 | Hu | G06F 12/00 |
| 9,389,995 B2* | 7/2016 | Hu | G06F 12/00 |
| 9,734,160 B1* | 8/2017 | Huntwork | G06F 17/30233 |
| 2008/0095079 A1* | 4/2008 | Barkley | H04L 12/1827 |
| | | | 370/260 |
| 2011/0313973 A1 | 12/2011 | Srivas et al. | |
| 2012/0101991 A1 | 4/2012 | Srivas et al. | |
| 2012/0209943 A1 | 8/2012 | Jung | |
| 2013/0166503 A1 | 6/2013 | Chung et al. | |
| 2013/0167151 A1* | 6/2013 | Verma | G06F 9/5066 |
| | | | 718/102 |
| 2013/0339966 A1* | 12/2013 | Meng | G06F 9/5061 |
| | | | 718/102 |
| 2014/0317056 A1 | 10/2014 | Kim et al. | |
| 2015/0035858 A1* | 2/2015 | Yang | G01C 21/206 |
| | | | 345/629 |
| 2015/0150017 A1* | 5/2015 | Hu | G06F 12/00 |
| | | | 718/103 |
| 2016/0179568 A1* | 6/2016 | Bezbaruah | G06F 9/45558 |
| | | | 718/1 |

\* cited by examiner

SHUFFLE EMBEDDED DISTRIBUTED STORAGE SYSTEM SUPPORTING VIRTUAL MERGE AND METHOD THEREOF

CROSS-REFERENCE TO RELATED APPLICATION

The present application claims priority to and the benefit of Korean patent application number 10-2015-0081437, filed on Jun. 9, 2015, the entire disclosure of which is incorporated herein in its entirety by reference.

BACKGROUND

Field of Invention

Various embodiments of the present invention relate to a technology of performing the step of shuffling and merging map results at a distributed shared storage level so as to improve the bottle neck problems in the performance of a map/reduce model, thereby providing a high-speed analyzing performance.

Description of Related Art

Due to the digital innovation accelerated by the development of information communication technologies, in the modern society, massive data is being created in real time. The emergence of various information channels represented by social service and smart devices and the increase of production, distribution, and capacity of information due to such emergence of various information channels led to a significant increase of data, exceeding the limitations of conventional data management and analyzing systems.

A map/reduce model is a representative open software based framework for storing and quickly analyzing such rapidly increasing data. The biggest characteristic of the map/reduce model is in dividing the data into small pieces and then distributing the data in a plurality of cluster nodes, so that calculation operations for analyzing the data can be performed in the nodes where the data is stored, thereby maximizing the parallel processing effect. However, in conventional map/reduce models, performance deteriorates severely due to excessive costs incurring at the step of shuffling and merging map intermediate results, which will be explained hereinafter with reference to FIGS. 1 and 2.

FIG. 1 is a view illustrating a concept of an operating process of a conventional map/reduce model, and FIG. 2 is a view illustrating a merging process of a reduce node in the conventional map/reduce model.

Referring to FIG. 1, an analyzing process performs a total of five steps as follows.

Step 1: reading data to be analyzed from a shared file system 101 and transmitting the data to a map function 102 input.

Step 2: storing intermediate data analyzed in each map function 102 and in a local disk 103 of a node where the map function 102 is performed.

Step 3: shuffling step of transmitting the intermediate data stored in the local disk 103 of all nodes to a reduce node through a network.

Step 4: receiving an intermediate result of each map function 102 from the reduce node via the network, and merging the intermediate result into one file so as to transmit the file to the reduce function 106.

Step 5: reading, by each reduce function 106, the merged file to output a final result, and recording the final result in the shared file system 101.

What the present invention noted is that in the aforementioned model, step 3 (shuffling among nodes) and step 4 (merging intermediate data) unnecessarily waste the network and disk resources, thereby causing deterioration of the entire analyzing performance.

First of all, at step 3, data transmission occurs from all map nodes to all reduce nodes in a method so called "All-to-All Shuffle", and thus extreme network resource consumption is inevitable. If there are M number of map nodes, and N number of reduce nodes, network transmission over the entire servers will occur for M×N number of times, resulting in consuming all the network resources.

Secondly, the step of merging the intermediate result received from each map function 102 at step 4 into one aligned file in order to transmit the same to the reduce function 106 is also being pointed out as a big cause behind deteriorating the entire analyzing performance. The reason to this will be explained with reference to FIG. 2.

As can be seen from FIG. 2, the reduce node receives the intermediate result of each map function 102 via the network 202, but cannot transmit the intermediate result directly to the reduce function 106, but has to temporarily store it in separate files 203 on a local disk 105.

The reason why the reduce node cannot transmit the data received via the network 202 directly to the reduce function 106 is because the results 203 of each map function 102 are aligned only at the level of each File-A, File-B, and File-C, and not aligned as a whole.

Therefore, the reduce node 106 reads each of File-A, File-B, File-C 203 temporarily stored in the local disk 105, goes through a merging operation in the memory 204, and re-records the ultimately aligned data in the local disk 105 as a separate File-M1 205, and then removes File-A, File-B, File-C 203 from the local disk 105.

When the merging operation is completed, the reduce function 106 reads the merged File-M1 file 205 from the local disk 105, and generates the final result.

As a result, in order to perform one reduce function, for the data of the size of the map intermediate result 203, twice the amount of WRITE and twice the amount of READ occurs through the local disk 105. This example is based on an assumption that there are three output results from the map function, but in actual large volume analyzing environments, there are many cases where one reduce node processes more than several dozens of map results, in which case the cost for temporarily storing, reading, merging and removing more than several dozens of intermediate data in and from a local file system will become a big cause behind significantly deteriorating the entire analyzing performance.

SUMMARY

A purpose of the present disclosure is to resolve the aforementioned difficulties of prior art, that is, to provide a shuffle embedded distributed storage system supporting virtual merge wherein a shuffling and merging function of a map intermediate result that used to be pointed out as the cause behind deterioration of analyzing performance is embedded in a distributed shared storage, thereby improving the entire analyzing performance, and a method for providing the same.

Furthermore, another purpose of the present disclosure is to provide a shuffle embedded distributed storage system supporting virtual merge capable of directly recording an intermediate result of each map function in a distributed file system instead of transmitting it to a reduce node, and a method for providing the same, thereby preventing unnecessary waste of network resources.

Furthermore, another purpose of the present disclosure is to provide a shuffle embedded distributed storage system supporting virtual merge capable of managing intermediate results of each map function in virtual merged files so as to provide virtually aligned data to a reduce function input without having to go through a process of merging the actual data, and a method for providing the same, thereby removing unnecessary wasting of disk resources in the merging process.

According to an embodiment of the present disclosure, there is provided a shuffle embedded distributed storage system supporting virtual merge, the system including a distributed shared storage configured to store a virtual merged file; a plurality of map servers connected to the distributed shared storage via a network, and configured to perform a map function and record a map result data computed as a result of the map function in the distributed shared storage by means of a map result file; and a plurality of reduce servers connected to the distributed shared storage and the map servers via the network, wherein the virtual merged file includes a list of the map result files recorded by the plurality of map servers, and an identifier of a reduce server to which the virtual merged file is to be transmitted.

Furthermore, the map servers may transmit the identifier of the virtual merged file to the reduce servers.

Furthermore, in response to receiving a request for data reading from a certain reduce server, the distributed shared storage may search a virtual merged file having an identifier that is identical to the certain reduce server, read and align data of the map result files included in the searched virtual merged file consecutively, and transmit the aligned data to the certain reduce server.

According to another embodiment of the present disclosure, there is provided a shuffle embedded distributed storage method supporting virtual merge, the method including reading, by a plurality of map servers, a map input file from a distributed shared storage, and performing a map function; performing the map function, and recording a computed map result data in the distributed shared storage by means of a map result file; and registering information on map result files recorded by the plurality of map servers in a virtual merged file.

Furthermore, the information on the map result files may be a list of the map result files.

The virtual merged file include an identifier of a reduce server to which the virtual merged file is to be transmitted.

The shuffle embedded distributed storage method supporting virtual merge may further include requesting, by the reduce server, the distributed shared storage to read data; determining whether or not there is remaining data in map result files registered in the virtual merged file; in response to there being remaining data in the map result files, circulating the map result files and reading data of a certain area and accumulating the read data in a memory; aligning the data accumulated in the memory; and transmitting the aligned data to the reduce server.

Furthermore, in response to there being no data remaining in the map result files, the reduce function of the reduce server may be ended.

Furthermore, the map servers, distributed shared storage and reduce server maybe connected to one another via a network.

Furthermore, after the information on the map result files is registered in the virtual merged file, the map servers may transmit the identifier of the virtual merged file to the reduce server.

According to the aforementioned embodiments of the present disclosure, it is possible to provide a shuffle embedded distributed storage system wherein the shuffling and merging step that used to be regarded as a bottle neck in the performance a conventional map/reduce model has been simplified, and a method thereof, thereby improving the data analyzing performance by more than several times.

BRIEF DESCRIPTION OF THE DRAWINGS

The above and other features and advantages of the present invention will become more apparent to those of ordinary skill in the art by describing in detail embodiments with reference to the attached drawings in which.

DETAILED DESCRIPTION

Figure 1:
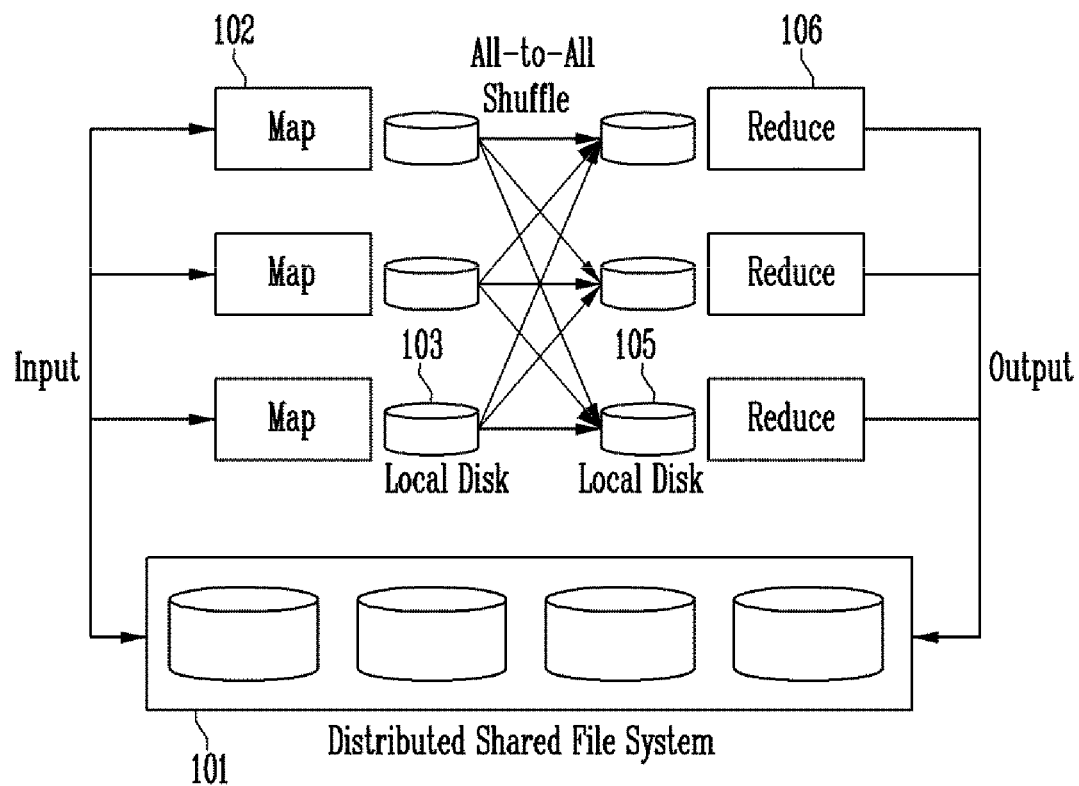
FIG. 1 is a view illustrating a concept of an operating process of a conventional map/reduce model.
Figure 2:
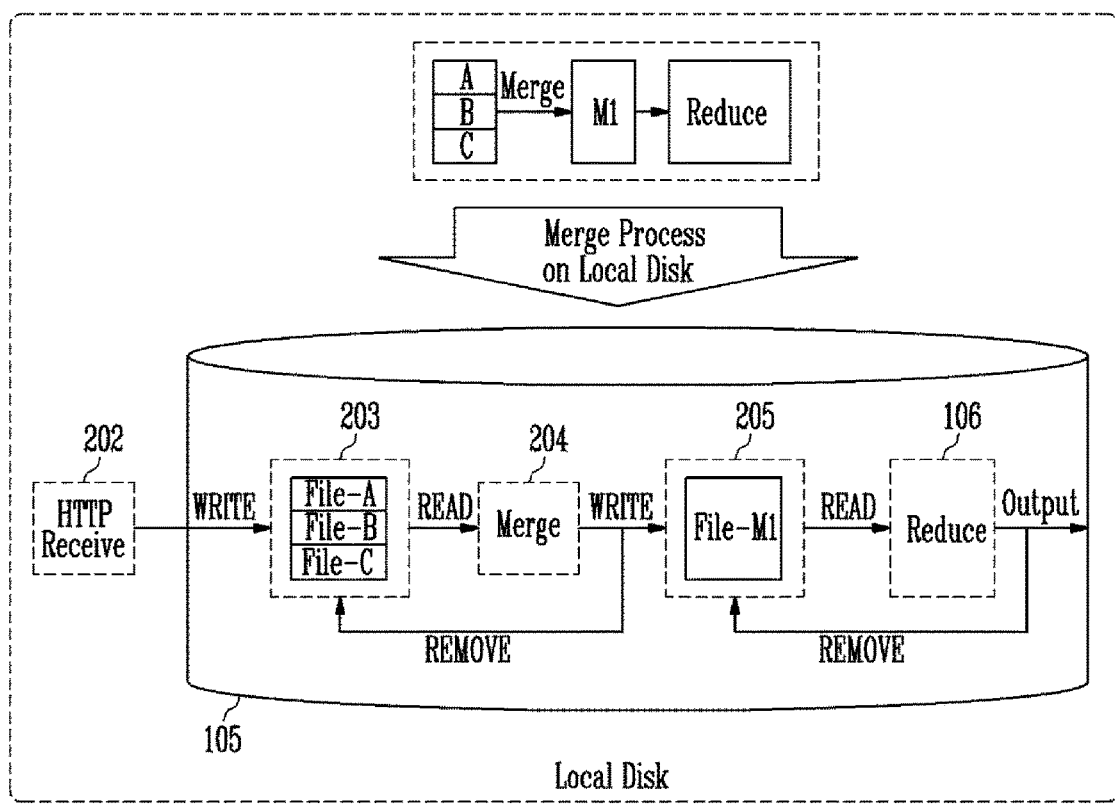
FIG. 2 is a view illustrating a merging procedure of a reduce node in a conventional map/reduce model.

Hereinafter, embodiments will be described in greater detail with reference to the accompanying drawings. Embodiments are described herein with reference to cross-sectional illustrates that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present invention. Furthermore, 'and/or' may include any one of or a combination of the components mentioned.

Furthermore, 'connected/accessed' represents that one component is directly connected or accessed to another component or indirectly connected or accessed through another component.

In this specification, a singular form may include a plural form as long as it is not specifically mentioned in a sentence. Furthermore, 'include/comprise' or 'including/comprising' used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinafter, a shuffle embedded distributed storage system supporting virtual merge according to an embodiment of the present disclosure and a method thereof will be explained with reference to the drawings.

The present disclosure provides a method for managing outputs of a map function and a method for managing inputs of a reduce function without changing the inherent roles of the map function and reduce function in a conventional map/reduce model.

The distributed shared storage that the present disclosure assumes is not limited to a certain technique or product. It means that the method that the present disclosure provides may be easily mounted on a most of the conventional distributed shared storage environment. Such a distributed shared storage may be a GlusterFS, PVFS2, Ceph, and GLORY-FS.

The uniqueness of a shuffle embedded distributed storage method that the present disclosure provides consists of the following two assumptions.

First of all, a shuffle process of transmitting output data of a map function to a reduce node through a network has been removed. That is, the present disclosure uses a method of, instead of transmitting output data of a map function to the network through a HTTP, directly recording the output data in a file of a distributed shared storage and indirectly transmitting it to a reduce node. The distributed shared storage is approachable from any map or reduce node, and thus merely recording the output data in the distributed shared storage has the same effect as transmitting to the reduce node.

Secondly, the present disclosure is characterized in removing the process of re-aligning the results of each map function and recreating the re-aligned results in one merged file, and abstracting the already created map output data into a virtual file so as to transmit the logically aligned data to the reduce function without having to go through a step of physically merging the file.

Figure 3:
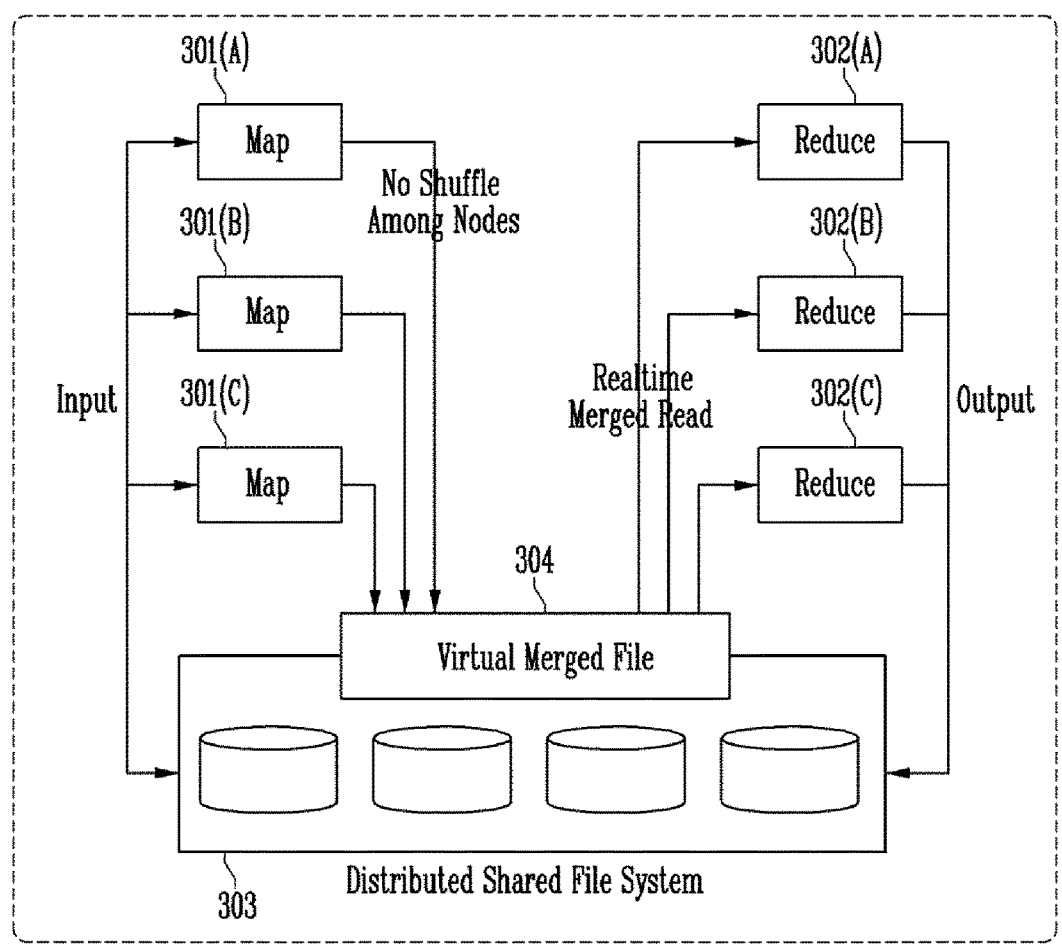
FIG. 3 is a view illustrating a shuffle embedded distributed storage system supporting virtual merge according to an embodiment of the present disclosure.

FIG. 3 is a view illustrating a shuffle embedded distributed storage system supporting virtual merge according to an embodiment of the present disclosure.

Referring to FIG. 3, the shuffle embedded distributed storage system supporting virtual merge according to an embodiment of the present disclosure may include a plurality of map servers 301(A), 301(B), 301(C), a plurality of reduce servers 302(A), 302(B), 302(C), and a distributed shared storage 303.

The map servers 301(A), 301(B), 301(C), reduce servers 302(A), 302(B), 302(C) and distributed shared storage 303 are connected to one another via a network.

The map servers 301(A), 301(B), 301(C) may read a map input file from the distributed shared storage 303 and perform a map function.

Furthermore, the map servers 301(A), 301(B), 301(C) may perform the map function and record a computed result (map result data) in the distributed shared storage 303.

For example, the map result data output from the map servers 301(A), 301(B), 301(C) may be stored in the distributed shared storage 303 by means of a map result file.

Herein, information on the map result files recorded in the map servers 301(A), 301(B), 301(C) may be registered in a virtual merged file 304.

The distributed shared storage 303 may store the map result data received from the map servers 301(A), 301(B), 301(C), and store the virtual merged file 304 that includes an identifier of a certain reduce server and a list of the map result files.

Without receiving the map result data from the map servers 301(A), 301(B), 301(C) directly, the reduce servers 302(A), 302(B), 302(C) may receive the map result data from the distributed shared storage 303.

For this purpose, the reduce servers 302(A), 302(B), 302(C) may use the virtual merged file 304 stored in the distributed shared storage 303.

The reduce servers 302(A), 302(B), 302(C) may perform a reduce function using the data transmitted from the distributed shared storage 303, and record the result (reduce result data) computed by performing the reduce function in the shared distributed storage 303.

Figure 4:
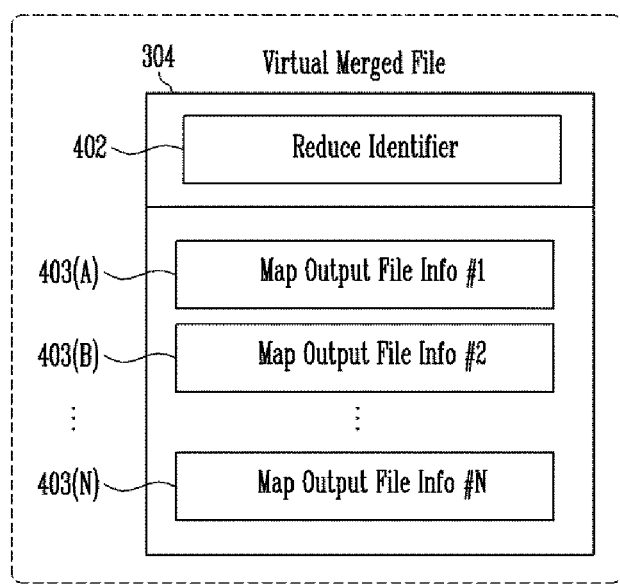
FIG. 4 is a view illustrating a concept of a virtual merged file according to an embodiment of the present disclosure.

FIG. 4 is a view illustrating a concept of a virtual merged file according to an embodiment of the present disclosure.

The virtual merged file 304 provided by the present disclosure is aimed at providing a virtual logical aligned file without physically merging the map result data, the virtual merged file 304 including an identifier 402 of a certain reduce server where final data is to be transmitted, and lists 403(A), 403(B), . . . , 403(N) of the map result files stored in the distributed shared storage 303.

In the present disclosure, there is no limitation to a certain embodiment regarding the virtual merged file 304. That is, the idea of the present disclosure may be mounted onto any kind of platform, that is, JAVA class or C Library.

Figure 5:
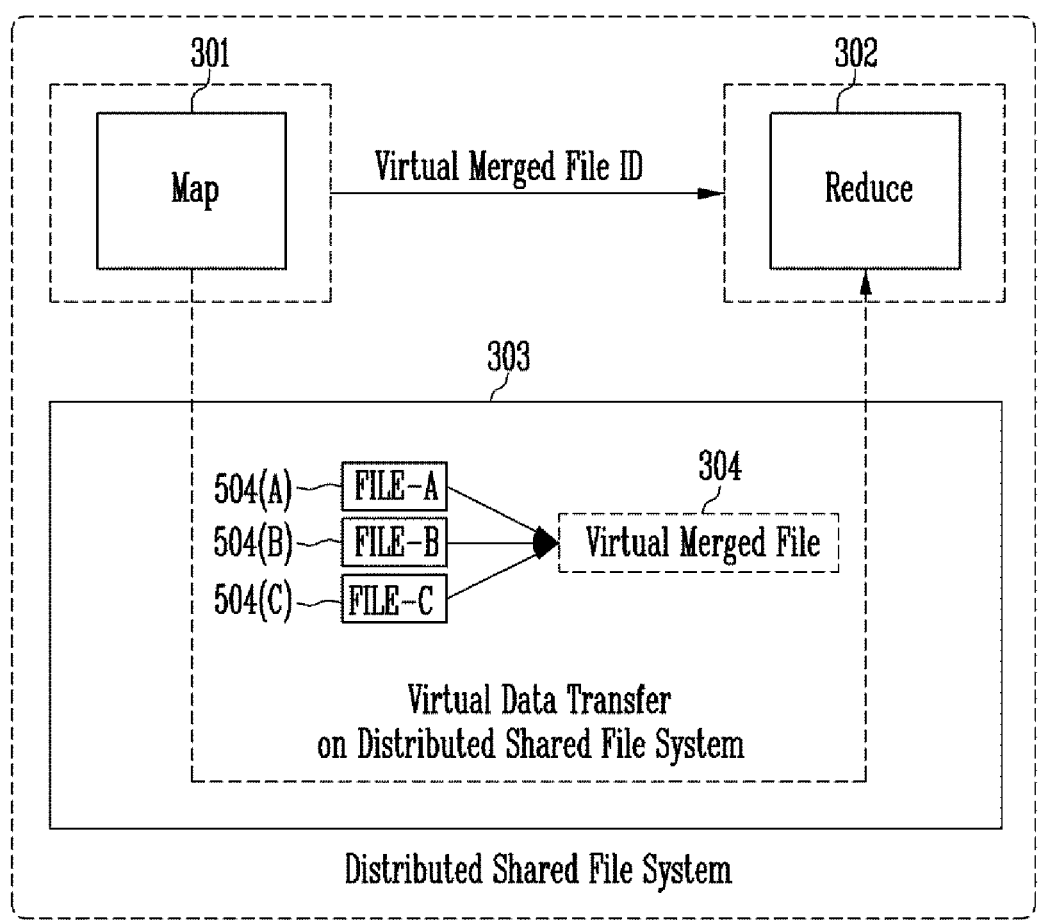
FIG. 5 is a view illustrating a concept of a data transmission process using a virtual merged file according to an embodiment of the present disclosure.

FIG. 5 is a view illustrating a concept of a process of transmitting data using a virtual merged file according to an embodiment of the present disclosure.

A difference from a conventional map/reduce model is that the process of transmitting data from the map server 301 to the reduce server 302 has been removed, but instead, only the identifier of the logically created virtual merged file 304 is transmitted to the reduce server 302.

Each virtual merged file 304 has information on map output files 504(A), 504(B), 504(C) as explained with reference to FIG. 4.

Figure 6:
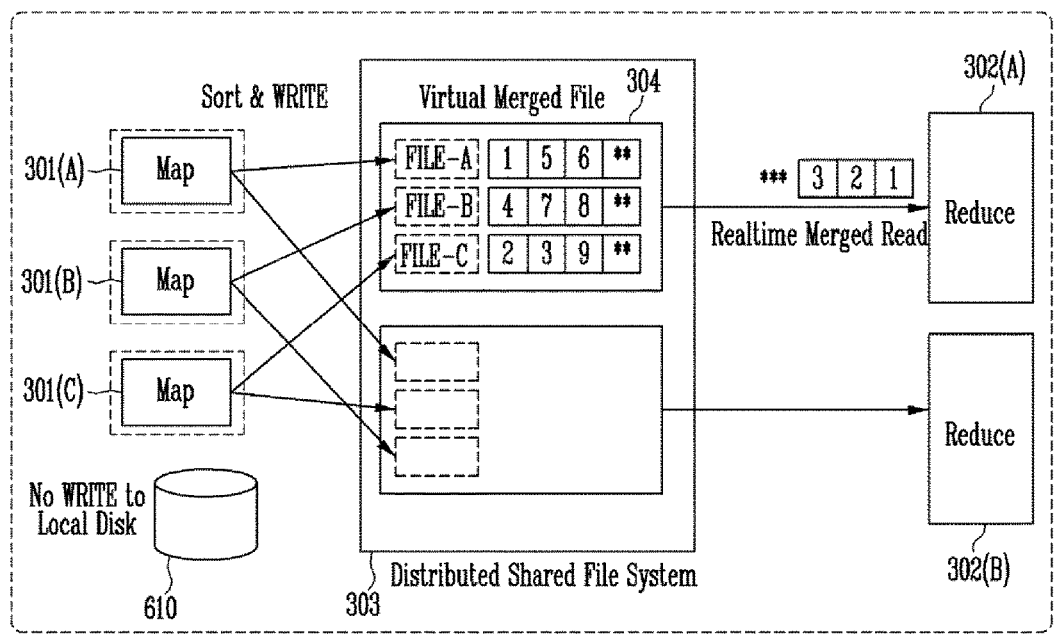
FIG. 6 is a view illustrating in detail a data transmission process using a virtual merged file according to an embodiment of the present disclosure.

FIG. 6 is a view illustrating in detail the data transmission method using a virtual merged file according to an embodiment of the present disclosure.

The shuffle and merge process using the virtual merged file 304 in the shuffle embedded distributed storage method that the present disclosure provides is performed in the following order.

First of all, instead of recording the map result data of each map server 301(A), 301(B), 301(C) in a local disk 610 of a node where a map function operates, the map result data is recorded in a file of the distributed shared storage 303.

For the sake of exemplification, the map result files recorded in the distributed shared storage 603 by each map server 301(A), 301(B), 301(C) will be referred to as File-A, File-B, and File-C.

In each file, the data computed by the map function is recorded in an aligned format. The reason why each of the outputs of the map function is aligned is because the map/reduce model itself provides such a function, and the present disclosure is based on an assumption that no modification will be made thereto.

Secondly, after each output data of the map function is recorded in a separate file of the distributed shared storage 303, a virtual merged file 304 is created that abstracts the output data. The virtual merged file 304 is not a file where the data actually exists, but has a mere purpose of indicating the information on each map result file File-A, File-B, File-C.

Thirdly, once all the output data of the map function is registered in the virtual merged file 304, the reduce servers 302(A), 302(B), 302(C) start the reduce operation. Conventional models used a method of physically merging the map result files File-A, File-B, File C so as to create an input file for the reduce servers 302(A), 302(B), 302(C), but the present disclosure removed such a merging process, but instead provides a method of transmitting the data being aligned in real time to the reduce servers 302(A), 302(B), 302(C) through the virtual merged file 304.

Figure 7:
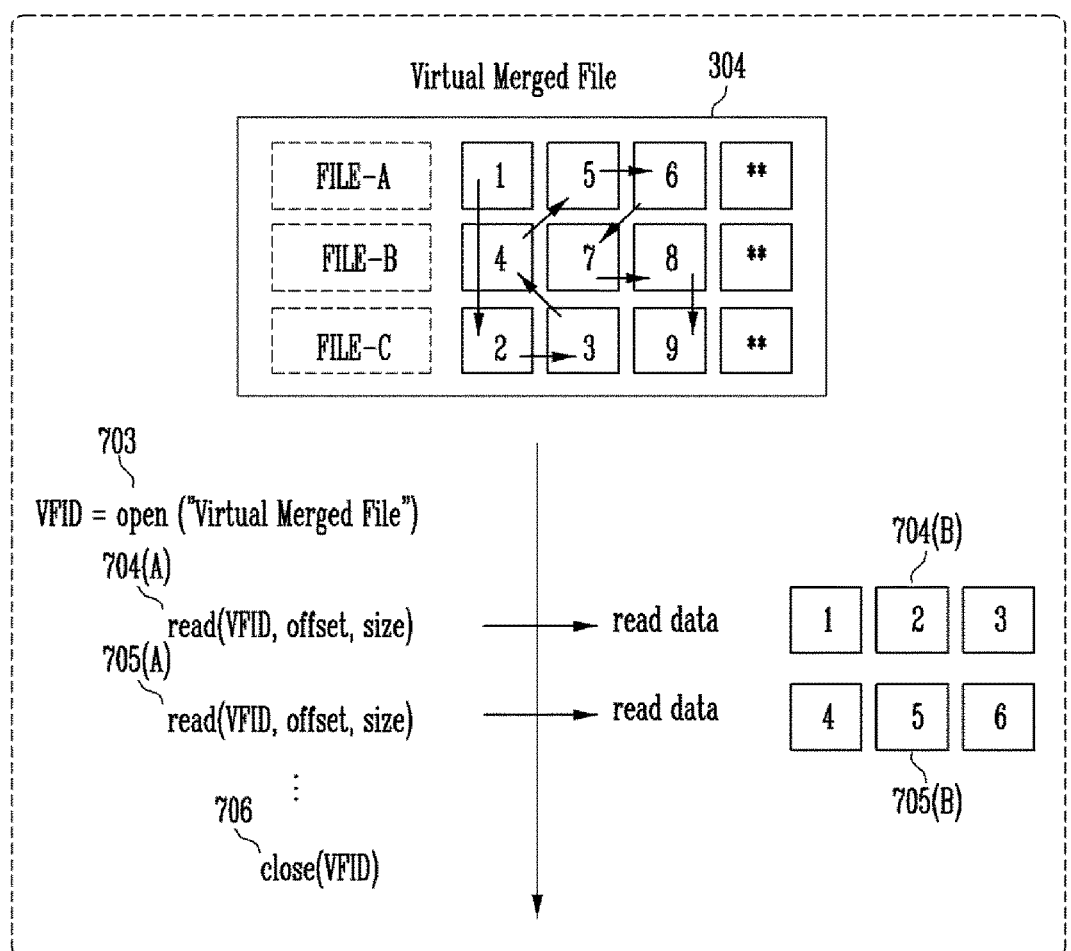
FIG. 7 is a view illustrating a real time data merging method using a virtual merged file according to an embodiment of the present disclosure.

FIG. 7 is a view illustrating a method for merging data in real time using a virtual merged file according to an embodiment of the present disclosure.

According to a method for providing a reduce input file being aligned in real time using the virtual merged file 304 that the present disclosure provides, the reduce input data may be created in real time through the following steps.

First of all, in a reduce function, a virtual merged file 304 is opened (see 703). Herein, the reduce function recognizes that the virtual merged file 304 is not a file of a special format but just a general file.

Secondly, when a read request is made in the reduce function, the virtual merged file 304 reads a certain area of the map result files File-A, File-B, File-C that it manages starting from a start position consecutively, and aligns the read data in a memory, and returns that data as a response to the read request. (See 704(A), 704(B), 705(A), 705(B))

Although each data of the map result files File-A, File-B, File-C is aligned, the virtual merged file 304 is not aligned as whole, and thus a process of circulating each file File-A, File-B, File-C for each read request of the reduce function is illustrated in FIG. 7.

Thirdly, when all the reduce operation is completed, the virtual merged file is ended. (see 706)

Figure 8:
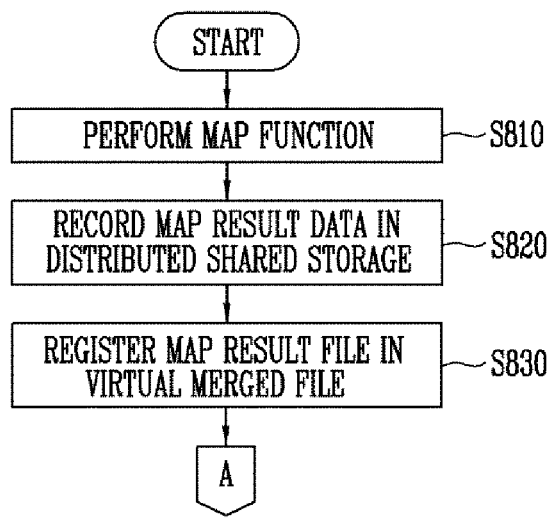
FIG. 8 is a flowchart illustrating a map step in a shuffle embedded distributed storage method supporting virtual merge according to an embodiment of the present disclosure.

FIG. 8 illustrates a flowchart of a map step in a shuffle embedded distributed storage method supporting virtual merge according to an embodiment of the present disclosure.

Referring to FIG. 8, the shuffle embedded distributed storage method supporting virtual merge according to an embodiment of the present disclosure may include a step of performing a map function (S810), step of recording a map result data in the distributed shared storage 303 (S820), and a step of registering a map result file in the virtual merged file 304 (S830).

At the step of performing a map function (S810), as the map function is initiated, the map servers 301(A), 301(B), 301(C) read a map input file in the distributed shared storage 303 and performs a map function.

At the step of recording the map result data in the distributed shared storage 303 (S820), the results computed through the map function (map result data) are not stored in a local disk where the map function operates, but are stored in an identifiable file of the distributed shared storage 303.

For example, the map servers 301(A), 301(B), 301(C) may store the map result data in the distributed shared storage 303 by means of map result files File-A, File-B, File-C.

Then, at the step of registering the map result file in the virtual merged file 304 (S830), information on the map result files File-A, File-B, File-C may be registered in the virtual merged file 304, and map function may be ended.

For example, the information on the map result files File-A, File-B, File-C may be a list of the map result files File-A, File-B, File-C.

Figure 9:
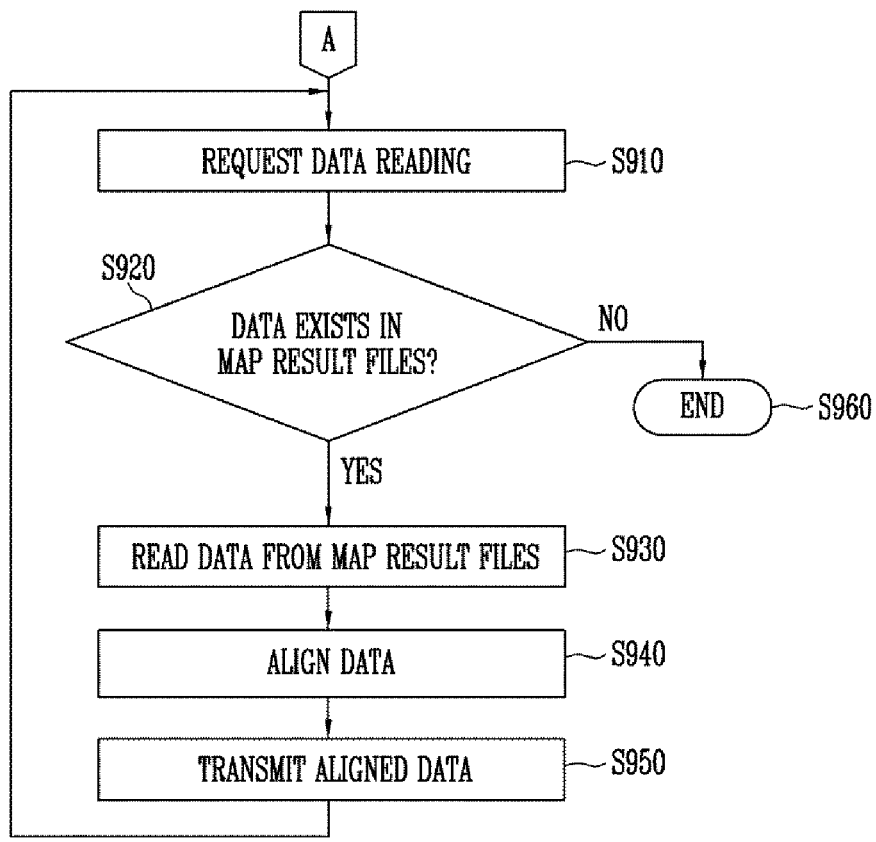
FIG. 9 is a flowchart illustrating a reduce step in a shuffle embedded distributed storage method supporting virtual merge according to an embodiment of the present disclosure.

FIG. 9 illustrates a flowchart of a reduce step in a method of a shuffle embedded distributed storage supporting virtual merge according to an embodiment of the present disclosure.

Referring to FIG. 9, the method of a shuffle embedded distributed storage supporting virtual merge according to an embodiment of the present disclosure may further include a step of requesting data reading (S910), a step of determining whether or not there exists remaining data in the map result files (S920), a step of reading the data (S930), a step of aligning the data (S940), and a step of transmitting the aligned data (S950).

At the step for requesting data reading (S910), as the reduce function is initiated, the reduce servers 302(A), 302(B), 302(C) request data through a read function from the start position of the virtual merged file 304.

At the step of determining whether or not there exists remaining data in the map result files (S920), it is possible to determine whether or not there is remaining data in the map result files File-A, File-B, File C registered in the virtual merged file 304 to be output to the reduce servers 302(A), 302(B), 302(C).

If there is no more data in the map result files File-A, File-B, File C registered in the virtual merged file 304 to be output to the reduce servers 302(A), 302(B), 302(C), the reduce function may be ended. (see S960).

Furthermore, at the step of aligning data (S940), if there is data in the map result files File-A, File-B, File C registered in the virtual merged file 304 to be output to the reduce servers 302(A), 302(B), 302(C), it is possible to circulate the map result files File-A, File-B, File C consecutively and read data of a certain area and accumulate the read data in a memory buffer.

Then, at the step of transmitting the aligned data (S950), the data accumulated in the memory buffer is aligned and its result is transmitted back to the reduce servers 302(A), 302(B), 302(C), and the step of requesting data reading (S910) is brought back to process a next data reading request.

In the drawings and specification, there have been disclosed typical exemplary embodiments of the invention, and although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A shuffle embedded distributed storage system supporting virtual merge, the system comprising:
a distributed shared storage configured to store a virtual merged file;

a plurality of map servers connected to the distributed shared storage via a network, and configured to perform a map function and record a map result data computed as a result of the map function in an aligned format in the distributed shared storage by means of a map result file; and a plurality of reduce servers connected to the distributed shared storage and the map servers via the network for performing a reduce function on the map result files received from the virtual merged file of the distributed shared storage, wherein the virtual merged file comprises a list of the map result files generated by the plurality of map servers, and an identifier of one of the plurality of reduce servers to which the virtual merged file is to be transmitted, wherein the map result files are registered in the virtual merged file, wherein one or more of the plurality of map servers transmits an identifier of the virtual merged file to one or more of the plurality of the reduce servers, and wherein, in response to receiving a request for data reading from a selected one of the plurality of reduce servers, the distributed shared storage searches the virtual merged file having an identifier that is identical to the selected reduce server, and reads and aligns data of the map result files included in the searched virtual merged file consecutively, and transmits the aligned data to the selected reduce server without merging the map result files.

2. A shuffle embedded distributed storage method supporting virtual merge, the method comprising:

reading, by a plurality of map servers, a map input file from a distributed shared storage, and performing a map function;

performing the map function, and recording a computed map result data in an aligned format in the distributed shared storage by means of a map result file;

registering information on map result files recorded by the plurality of map servers in a virtual merged file, wherein the virtual merged file comprises a list of the map result files generated by the plurality of map servers, and an identifier of one of the plurality of reduce servers to which the virtual merged file is to be transmitted, transmitting by one or more of the plurality of map servers an identifier of the virtual merged file to one or more of the plurality of the reduce servers, in response to receiving a request for data reading from a selected one of the plurality of reduce servers, searching the virtual merged file having an identifier that is identical to the selected reduce server, and reading and aligning data of the map result files included in the searched virtual merged file consecutively, and transmitting the aligned data to the selected reduce server without merging the map result files.

3. The shuffle embedded distributed storage method supporting virtual merge according to claim 2, further comprising:

requesting, by the reduce server, the distributed shared storage to read data;

determining whether or not there is data remaining in map result files registered in the virtual merged file;

in response to there being data in the map result files, circulating the map result files and reading data of a certain area and accumulating the read data in a memory;

aligning the data accumulated in the memory; and transmitting the aligned data to the reduce server.

4. The shuffle embedded distributed storage method supporting virtual merge according to claim 3, wherein, in response to there being no data remaining in the map result files, the reduce function of the reduce server is ended.

5. The shuffle embedded distributed storage method supporting virtual merge according to claim 3, wherein the map servers, distributed shared storage and reduce server are connected to one another via a network.

6. The shuffle embedded distributed storage method supporting virtual merge according to claim 3, wherein, after the information on the map result files is registered in the virtual merged file, the map servers transmit the identifier of the virtual merged file to the reduce server.

* * * * *